(12) United States Patent
Yamazaki

(10) Patent No.: US 6,411,594 B1
(45) Date of Patent: *Jun. 25, 2002

(54) OPTICAL DISK HAVING CLAMP PORTION HIGHER THAN SUBSTRATE

(75) Inventor: Kenji Yamazaki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,653

(22) Filed: Dec. 17, 1997

(30) Foreign Application Priority Data

Dec. 25, 1996 (JP) .............................. 8-346106

(51) Int. Cl.[7] ................................................ G11B 5/84
(52) U.S. Cl. ...................................... 369/282; 369/290
(58) Field of Search ............................... 369/275.1, 94, 369/290, 291, 13, 14, 273, 272, 282, 283; 428/64.1, 64.4

(56) References Cited

U.S. PATENT DOCUMENTS

| | | | | |
|---|---|---|---|---|
| 4,634,617 A | * | 1/1987 | Ohta et al. | 428/65 |
| 4,926,410 A | * | 5/1990 | Suzuki et al. | 369/290 |
| 5,072,438 A | * | 12/1991 | Suzuki et al. | 369/290 |
| 5,085,910 A | * | 2/1992 | Matsushima et al. | 369/288 |
| 5,151,310 A | * | 9/1992 | Yanagisawa et al. | 369/288 |
| 5,438,564 A | * | 8/1995 | Takahashi | 369/290 |
| 5,448,547 A | * | 9/1995 | Minoda et al. | 369/282 |
| 5,560,880 A | * | 10/1996 | Takahashi et al. | 369/290 |

* cited by examiner

Primary Examiner—Tan Dinh
(74) Attorney, Agent, or Firm—Oblon, Spivak, McClelland, Maier & Neustadt, P.C.

(57) ABSTRACT

A magneto-optical disc is prepared having substrates made from polycarbonate, on which recording layers are formed to serve as signal recording medium sections facing each other via a spacer. The magneto-optical disc is also provided with a clamp portion formed in such a way that when the magneto-optical disc is mounted on an optical disc recording and/or reproduction apparatus having an objective lens with a focal distance $L_0$ the recording layer is positioned at a distance $L_1$ which is equal to a focal distance of the objective lens obtained in the substrate via refraction.

20 Claims, 6 Drawing Sheets

OPTICAL DISK HAVING CLAMP PORTION HIGHER THAN SUBSTRATE

BACKGROUND OF THE INVENTION

1. Field of the Invention

The present invention relates to an optical disc such as an optical disc and a magneto-optical disc onto/from which data is written or read out by an optical disc recording/reproduction apparatus.

2. Description of the Prior Art

An optical disc including a magneto-optical disc has been suggested for saving audio, video, or computer data. This optical disc, for example, has a recording section on a transparent substrate and data is recorded on this recording section.

Figure 1:
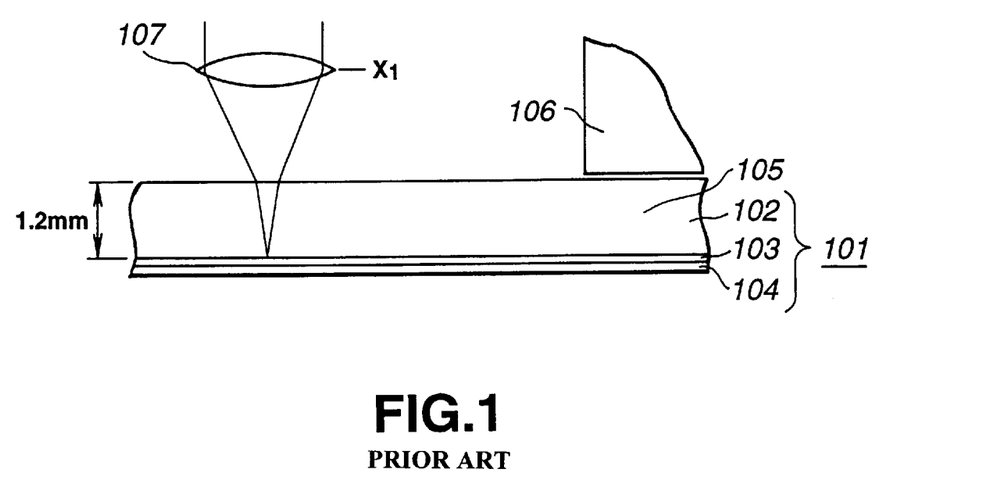
FIG. 1 shows configuration of a conventional magneto-optical disc.

For example, as shown in FIG. 1, a magneto-optical disc having a signal recording plane only on one side is formed from a disc-shaped transparent resin such as polycarbonate includes: a substrate 102 having a thickness of, for example, about 1.2 mm; a recording layer 103 formed on the substrate 102; and a protection layer 104 formed on the recording layer 103. This magneto-optical disc 101 is an optical disk normalized by the International Standard Organization (ISO) such as ISO/IEC 10089 and 13549 and enables data writing by forming the recording layer 103 from a magnetized film. The magneto-optical disc 101 has a clamp portion 105 at the center portion.

Moreover, an optical disc recording and/or reproduction apparatus enabled to write or read data onto/from the magneto-optical disc 101 includes: a clamp 106 for holding a hub (not depicted) provided in the clamp portion 105 of the mounted magneto-optical disk 101 and for rotating the magneto-optical disc 101; and an objective lens 107 for focusing a laser beam emitted from a light source (not depicted) on the recording layer 103. The objective lens 107 and the clamp 106 are arranged at positions matching the configuration of the magneto-optical disc mounted on the optical disc recording and/or reproduction apparatus.

For example, the objective lens 107 is supported in such a manner that it can move within a predetermined stroke for focus servo. The objective lens 107 is positioned at a neutral position (position $X_1$ in FIG. 1) of the focus servo for the magneto-optical disc 101.

The optical disc recording and/or reproduction apparatus is configured for writing or reading onto/from the magneto-optical disc 101.

Figure 2:
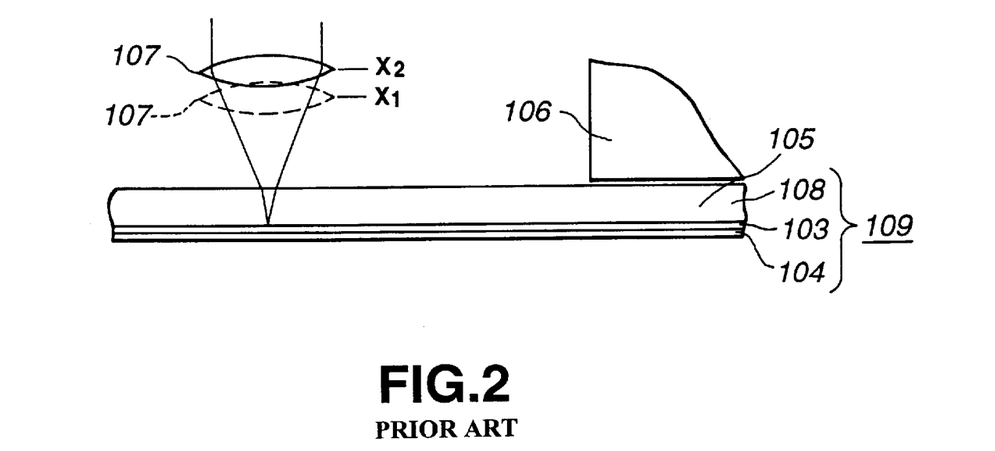
FIG. 2 shows configuration a conventional magneto-optical disc which requires shifting of a lens.

Here, the magneto-optical disc 101 can have increase data recording density by decreasing the thickness of the substrate as shown in FIG. 2. It should be noted that FIG. 1 and FIG. 2 show a single-sided type magneto-optical disc, but a double-sided magneto-optical disc can have further increased data recording density.

It has been desired to provide an optical disc recording and/or reproduction apparatus capable of recording or reproducing data onto from both of the magneto-optical disc 101 having a conventional substrate thickness of about 1.2 mm. and a magneto-optical disc 109 which is said to enable a higher recording density by reducing a substrate thickness. That is, an apparatus compatible for both of the discs is desired.

In this case, it is considered to design a compatible optical disc recording and/or reproducing apparatus to match with, for example, the conventional magneto-optical disc 101. For example, if the objective lens 107 is subjected to a focus servo when a magneto-optical disc is mounted, data can be recorded or reproduced onto/from both of the magneto-optical discs 101 and 109.

However, if it is impossible to obtain a stroke (a distance between $X_1$ and $X_2$ in FIG. 2) required for carrying out a focus servo to the magneto-optical disc 109, the optical disc recording and/or reproduction apparatus cannot carry out focusing.

Furthermore, if focus is obtained at a shift limit position of the objective lens 107 during a focus servo, a focus characteristic is deteriorated because the objective lens 107 is not positioned at a neutral position for carrying out an appropriate focusing.

Moreover, in order to provide a greater shift stroke for the objective lens 107, the optical disc recording and/or reproduction apparatus should have an additional function.

SUMMARY OF THE INVENTION

It is therefore an object of the present invention to provide an optical disc onto which focusing can be obtained with the same objective lens even if the substrate thickness varies.

The optical disc according to the present invention includes: a transparent substrate; a recording layer formed on the transparent substrate; and a clamp portion provided at a center portion of the transparent substrate; the clamp portion and the transparent substrate having surfaces different in height so that the recording layer plane is positioned in the vicinity of a focus position of the objective lens which is at a neutral position.

According to another aspect of the invention, the optical disc has a higher recording density than a normalized optical disc, and includes: a transparent substrate having a smaller thickness than the normalized optical disc; a recording layer formed on the transparent substrate; and a clamp portion which has a thickness identical to that of the normalized optical disc and is rotatably supported by a clamper provided in an optical disc recording and/or reproduction apparatus.

The optical disc having the aforementioned configuration is enabled to minimize the stroke of the objective lens provided in the optical disc recording and/or reproduction apparatus.

DETAILED DESCRIPTION OF THE PREFERRED EMBODIMENTS

Description will now be directed to preferred embodiments of the present invention with reference to the attached drawings.

That is, explanation will be given on a magneto-optical disc onto/from which data can be written or read out by applying a laser beam through an objective lens provided in an optical disc recording and/or reproduction apparatus.

Here, the optical disc recording and/or reproduction apparatus is a compatible optical disc recording/or reproduction apparatus capable of writing and reading out data onto/from magneto-optical discs having different substrate thicknesses, for example, a magneto-optical disc having a substrate thickness of about 0.6 mm and a magneto-optical disc having a substrate thickness of about 1.2 mm.

The aforementioned optical disc recording and/or reproduction apparatus includes: a rotation drive block to be matched with a clamp portion formed at the rotation center of the magneto-optical disc, to rotate the magneto-optical disc; and an objective lens for focusing a laser beam on a signal recording plane of the magneto-optical disc.

The aforementioned objective lens and the clamp are arranged in an optical disc recording and/or reproduction apparatus to match with the conventional magneto-optical disc having a substrate thickness of about 1.2 mm. More specifically, the objective lens is positioned at a neutral position, i.e., at an intermediate position of focus servo carried out for the magneto-optical disc having the substrate thickness of about 1.2 mm.

Figure 3:
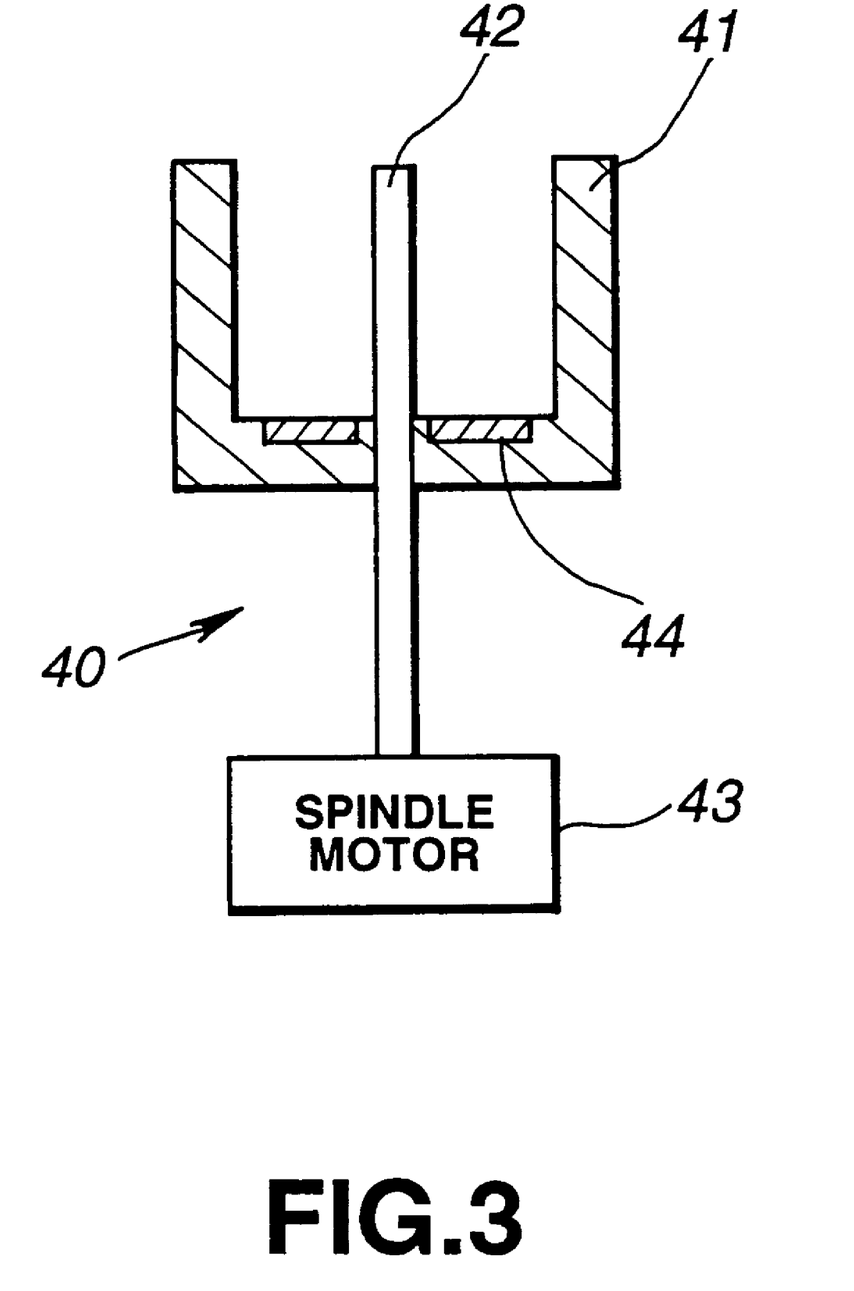
FIG. 3 is a cross-sectional view showing a disc rotation drive block for rotating the aforementioned magneto-optical disc.

The disc rotation drive block 40 serves to rotate the aforementioned magneto-optical discs and as shown in FIG. 3, and includes: a damper 41 formed so as to match with a hub provided on the magneto-optical disc which will be detailed later; a spindle shaft 42 which thrusts through and supports the damper 41; and a spindle motor 43 for rotating this spindle shaft 42. The clamper 41 is formed approximately into a cylindrical shape having one end open and has a magnet 44 formed into a ring shape at the bottom of the damper 41. This disc rotation drive block 40 is arranged in the optical disc recording and/or reproduction apparatus in such a manner that the damper 41 is properly matched with the normalized magneto-optical disc having the substrate thickness of 1.2 mm.

Hereinafter, explanation will given on a double-sided magneto-optical disk having a signal recording plane on both sides, whereas the magneto-optical disk having the substrate thickness of 1.2 mm will be referred to as the other type of magneto-optical disc.

Figure 4:
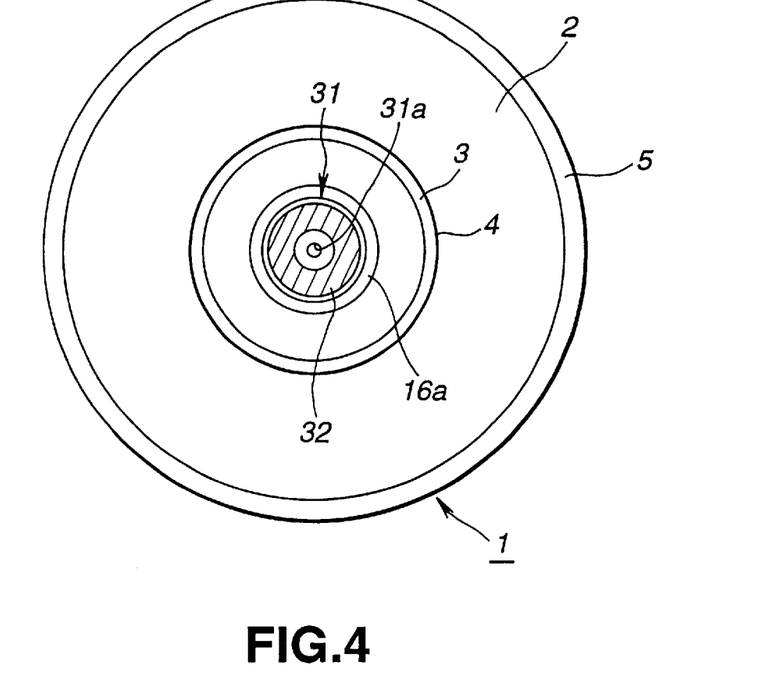
FIG. 4 is a plan view of a magneto-optical disc according to the present invention.

FIG. 4 is a plan view showing the aforementioned magneto-optical disc having a substrate thickness of 0.6 mm. As shown in FIG. 4, the magneto-optical disc a has a disc shape consisting of a recording area where a data signal is recorded; a control track 3 positioned at the inner circumference of this recording area 2 for containing data such as sector length and modulation method; and a control track 4 positioned at the inner circumference of the recording area 2 and a control track 5 positioned at the outer circumference of the recording area 2 for containing data such as recording and erase conditions.

Figure 5:
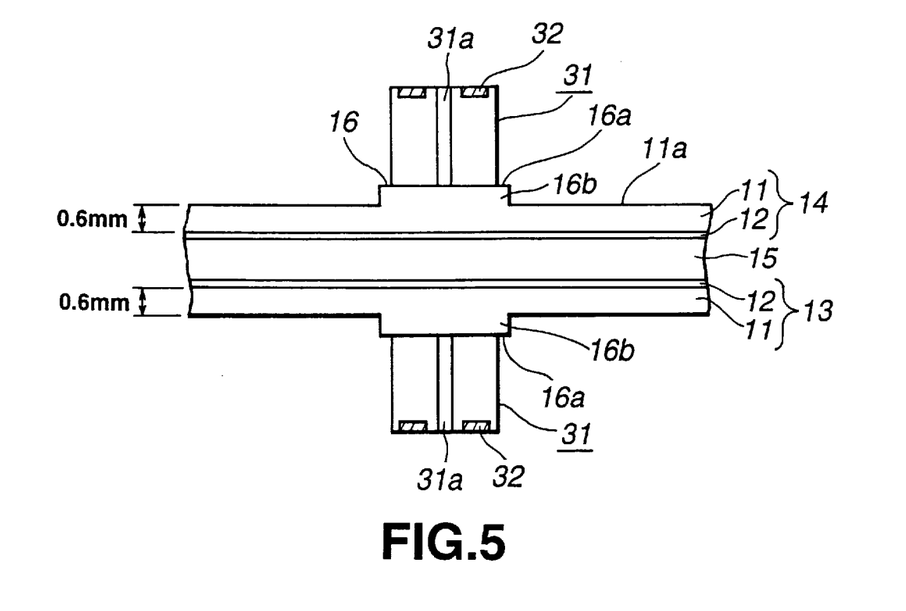
FIG. 5 shows a configuration of the aforementioned magneto-optical disc.

As shown in FIG. 5, the magneto-optical disc 1 having the aforementioned control tracks 3, 4, and 5, and the recording area 2 consists of a first signal recording medium section 13 including a substrate 11 and a recording layer 12 formed on the substrate 11 and a second signal recording medium section 14 consisting of a substrate 11 and a recording layer 12 formed on the substrate 11. The first signal recording medium section 13 and the second signal recording medium section 14 are arranged with their recording layers facing to each other, while sandwiching a spacer 15. Thus, the magneto-optical disc 1 has a signal recording plane on both sides.

The aforementioned substrate 11 is made from a transparent resin material such as polycarbonate having a thickness of 0.6 mm.

The aforementioned recording layer 12 is made from a magnetized film enabling writing data. For example, when data is recorded, a laser having a power adjusted for a data writing is applied from the optical disc recording and/or reproduction apparatus and the magnetization direction is changed by the magnetic head, thus writing data on the recording layer 12.

The aforementioned spacer 15 is made from, for example, a transparent resin material such as polycarbonate in the same way as the substrate 11.

The magneto-optical disc 1 has the aforementioned clamp portion 16 formed at the center portion. This clamp portion 16 has an upper surface 16a formed higher than a substrate surface 11a so that the recording layer 12 is positioned at the neutral position when focused by the objective lens. Hereinafter, detailed explanation will given on a forming position of this substrate surface 11a.

Figure 6:
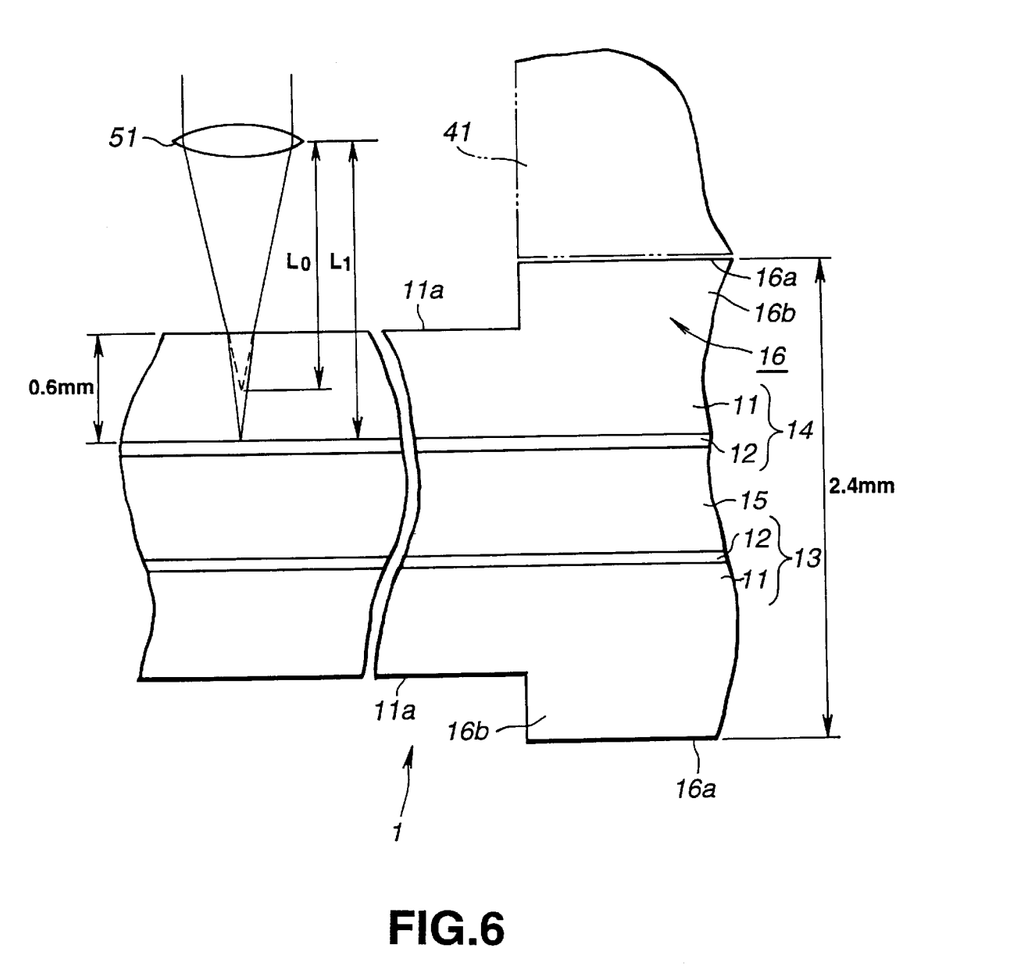
FIG. 6 shows a configuration of an essential portion of the aforementioned magneto-optical disc.

As shown in FIG. 6, when the magneto-optical disc 1 is mounted on the optical disc recording and/or reproduction apparatus, the objective lens 51 has a natural focal distance $L_o$ which is changed to a distance $L_1$ because light incident at the substrate surface 11a is refracted. That is, the focal distance is changed so that the incident light is focused on the recording layer 12 at approximately 0.6 mm from the substrate surface 11a. In other words, the magneto-optical disc 1 is held by the damper 41 so that the substrate surface 11a is located at a proper position for the neutral position of the objective lens 51, thus enabling the lens 51 to focus on the recording layer 12. Here, the clamper 41, as has been described above, is arranged so that the clamp portion of the aforementioned other type of magneto-optical disc can be properly mounted. However, the magneto-optical disc 1 is sure to be mounted on this damper 41 by the clamp portion surface 16a positioned at a protruding position from the substrate surface 11a.

The magneto-optical disc 1 has such a clamp portion surface 16a formed on both sides of the disc. Moreover, the magneto-optical disc 1 adjusts a distance between the two clamp portion surfaces 16a and 16a by the thickness of the spacer 15 formed to approximately 2.4 mm so that the distance will be identical to the thickness of the other type of magneto-optical disc 26 which will be detailed below.

Figure 7:
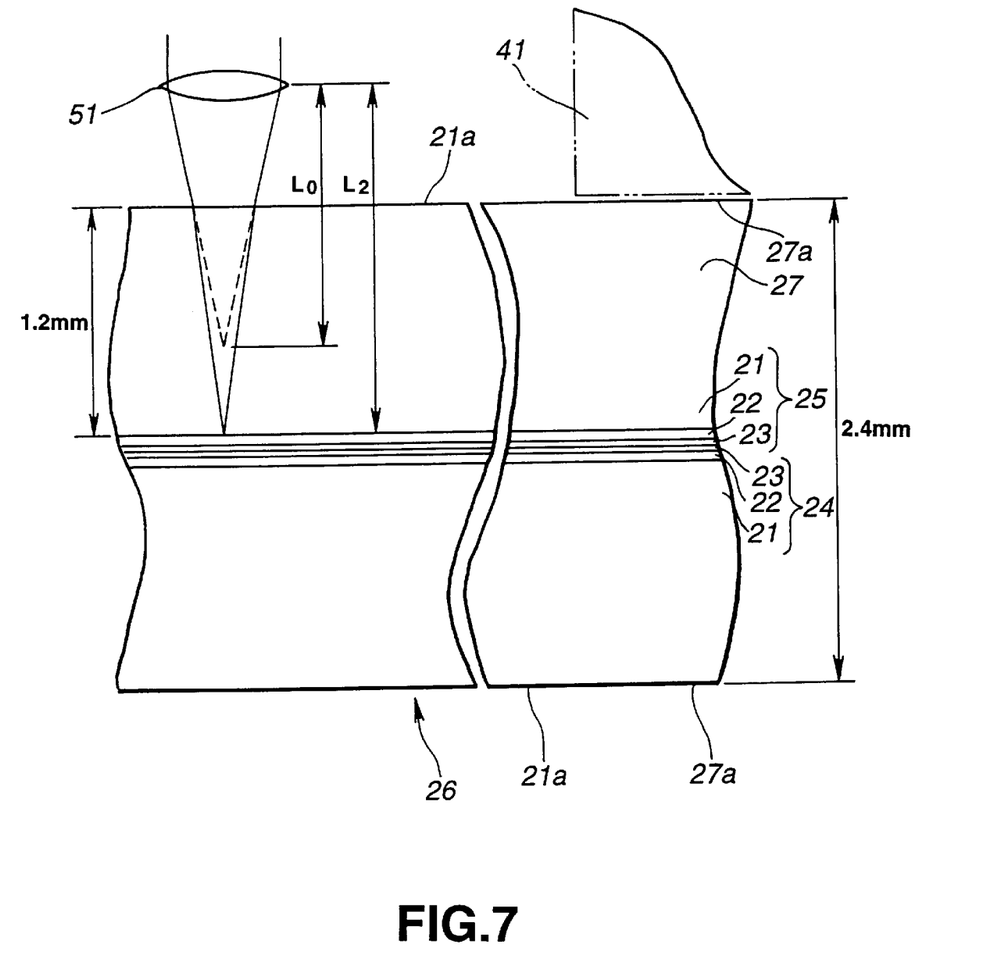
FIG. 7 shows configuration of a magneto-optical disc according to another embodiment of the present invention.

FIG. 7 shows a configuration of the other type of magneto-optical disc having a normalized substrate thickness of 1.2 mm with a recording plane on both sides. This magneto-optical disc includes two signal recording medium sections 24 and 25, each consisting of a substrate 21; a recording layer 22 formed on the substrate 21; and a protection layer 23 formed on the recording layer 22.

As shown in FIG. 7, the aforementioned clamper 41 and the objective lens 51 are arranged to match with the other type of magneto-optical disc 26 so that a clamp portion 27 has a clamp portion surface 27a and forms a single plane with a substrate surface 27a without any step.

That is, the clamper 41 and the objective lens 51 are arranged in such a manner that when the other type of magneto-optical disc 26 is mounted on the clamper 41, the objective lens 51 has a natural focal distance $L_0$ which is changed by reflection in the substrate 21 to a focal distance $L_2$, enabling the lens 51 to focus on the recording layer 22.

It should be noted that the other type of magneto-optical disc has a clamp portion surface 27a on both sides. Moreover, the other type of magneto-optical disc is formed to have the clamp portion 27 with a thickness of approximately 2.4 mm which is also the distance between the two substrate surfaces 21a and 21a.

Thus, the magneto-optical disc 1 and the other type of magneto-optical. disc 26 can be focused by the objective lens 51 having an identical neutral position.

Moreover, each of the magneto-optical discs 1 and 26 is provided with a hub which is coaxial with the clamp portion. For example, as shown in FIG. 4 and FIG. 5, the hub is formed approximately into a cylindrical form so that the clamper 41 of the disc rotation drive block 40 can be attached and removed to/from the hub. That is, the hub 31 has an outer diameter which is slightly smaller than the inner diameter of the clamper 41. Moreover, the hub 31 is provided with a magnetic metal member 32 formed into a rig shape and attached at both ends of the hub 31. The hub 31 also has a through hole 31a into which the spindle shaft 42 of the disc rotation drive block 40 is inserted.

Each of the aforementioned magneto-optical discs 1 and 26 is surely held by the disc rotation drive block 40 via the hub formed as described above.

Figure 8:
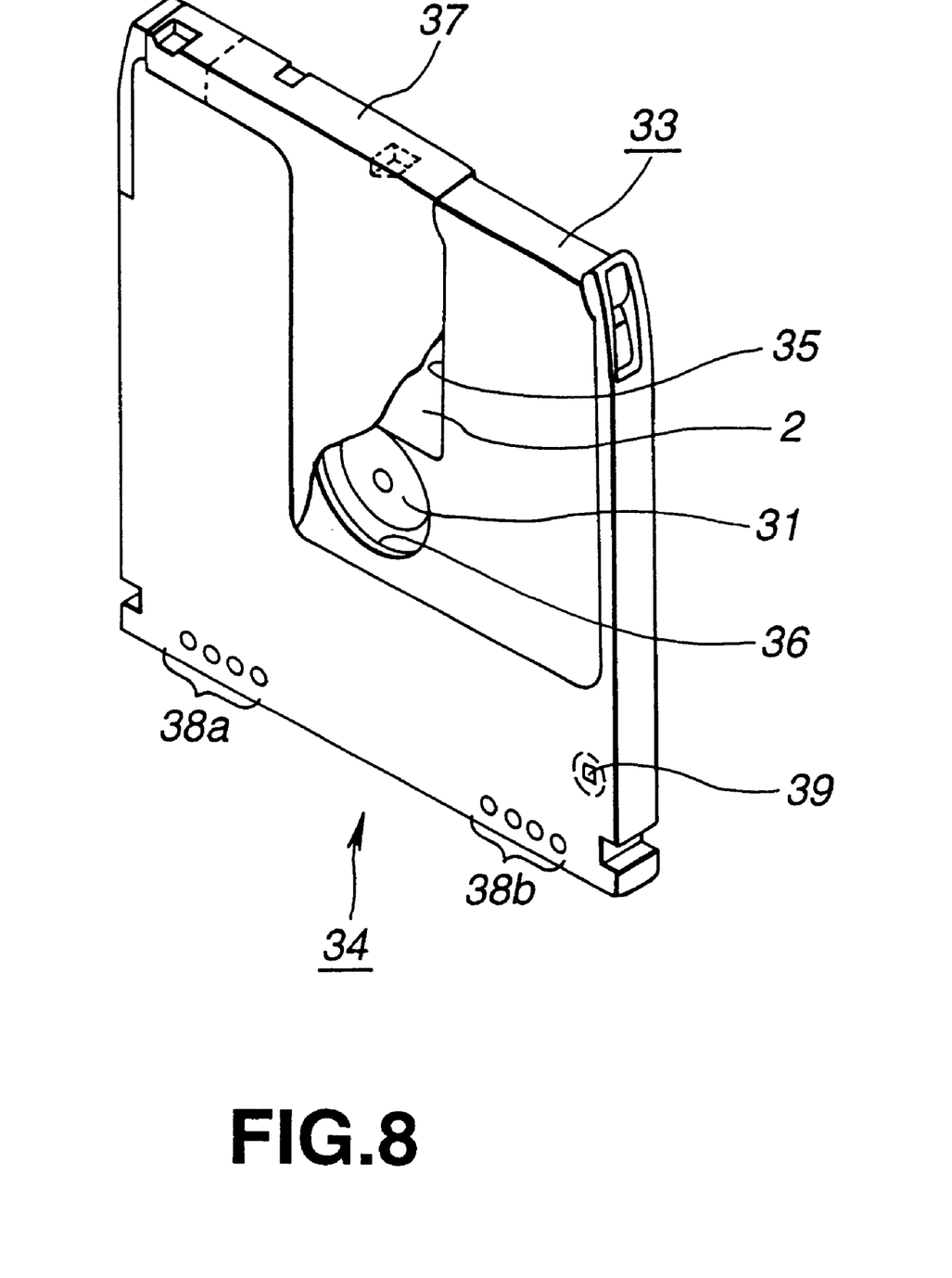
FIG. 8 is a perspective view showing the aforementioned magneto-optical disc contained in a disc cartridge.

Each of the magneto-optical discs 1 and 26 having the above described configurations are rotatably contained in a disc cartridge 34 having a cartridge body 33 formed approximately into a thin square type box. This disc cartridge 34 has: a magnetic head advance opening 35 allowing a magnetic head of the optical disc recording and/or reproduction apparatus to access the recording area 2 of the magneto-optical disc contained in the cartridge body 33; a disc rotation drive block to advance opening 36 allowing the clamper 41 of the disc rotation drive block 40 to be mounted on the hub 31 of the magneto-optical disc 1, 26; a shutter 37 which is slidably supported on the cartridge body 33 for covering the magnetic head advance opening 35 and the disc rotation drive block 40 advance opening 36; identifier holes 38a and 38b for identifying information of the signal recording medium sections of the magneto-optical disc 1, 26; and a positioning hole 39 for positioning the cartridge when inserted into the optical disc recording and/or reproduction apparatus.

The disc cartridge 34 also serves to prevent adhesion of dusts to the signal recording medium sections of the magneto-optical disc 1 and 26 when contained in the disc cartridge 34. When the disc cartridge is mounted on the optical disc recording and/or reproduction apparatus (not depicted) for recording or reproduction, the magneto-optical disc 1 or the other type of magneto-optical disc 26 is mounted on the disc rotation drive block 40 as described above.

For example, when data is to be written onto the magneto-optical disc 1, focusing can be carried out with the objective lens 51 whose neutral position is almost identical to the case when the other type of magneto-optical disc 26 is mounted.

That is, the optical disc recording and/or reproduction apparatus can obtain a sufficient stroke for focus servo from the neutral position of the objective lens 51, preventing deterioration of the focus servo characteristics.

Thus, the magneto-optical disc 1 having the clamp portion 16 can be arranged in the optical disc recording and/or reproduction apparatus having the objective lens 51 with its focus position adjusted for the other type of magneto-optical disc 26, without changing the focus servo stroke. Consequently, the optical disc recording and/or reproduction apparatus need not provide a particular function for coping with the magneto-optical discs having different substrate thicknesses, thus enabling to suppress any increase of the apparatus size as well as production costs.

Moreover, as focusing can be carried out at the same position without moving the objective lens 51 according to the type of the magneto-optical disc, this brings about a great advantage for an optical disc recording and/or reproduction apparatus which, for example, reads a signal recording plane of a magneto-optical disc mounted to identify the type of the magneto-optical disc.

It should be noted that the clamp portion surface 16a of the magneto-optical disc 1 can also be formed as indented from the surface 11a of the substrate 11. For example, this can be applied when the magneto-optical disc 1 has a substrate thickness greater than that of the other type of magneto-optical disc 26.

Moreover, the magneto-optical disc 1 may have the clamp portion 16 with the protruding portion 16b made from another material, for example, a material having a mechanically superior strength. In such a case, the magneto-optical disc 1 can have increased strength against shock applied when mounting and removing the damper 41.

Furthermore, the magneto-optical disc 1 is not limited to the aforementioned double-sided disc but can also be applied to a single-sided disc having a signal recording plane on one side.

The magneto-optical disc according to the present invention has a clamp portion surface and a transparent substrate surface which are different in height so that the recording layer plane is at a focus position of the objective lens at a neutral position. This enables to carry out focus servo at the same position without changing the position of the objective lens according to magneto-optical discs having different substrate thicknesses. Consequently, the optical disc recording and/or reproduction apparatus need not have a particular function for focusing on the aforementioned magneto-optical disc.

What is claimed is:

1. An optical disc for reading and writing data using a laser beam applied via an objective lens provided in an optical disc recording and/or reproduction apparatus, said optical disc comprising:

a transparent substrate;

a recording layer formed on said transparent substrate;

a clamp portion provided at a center portion of said transparent substrate, said clamp portion including a clamp portion surface at a top of said clamp portion and being integrated with said transparent substrate such that said clamp portion and said substrate form a one-piece unitary element; and a hub portion provided on said clamp portion coaxial with said clamp portion, and wherein said hub portion has a through hole into which a spindle shaft of a disc rotation device is inserted and has an outer diameter that is smaller than an outer diameter of said clamp portion;

said clamp portion and said transparent substrate outside of said center portion having surfaces different in height so that said recording layer is positioned in the vicinity of a focus position of said objective lens which is at a neutral position.

2. An optical disc as claimed in claim 1, wherein said disc is a double-sided disc having two of said transparent substrates and two of said recording layers facing each other and sandwiched by said two transparent substrates.

3. An optical disc as claimed in claim 2, said clamp portion having greater thickness than said substrate outside of said center portion.

4. An optical disc, comprising:

a transparent substrate;

a recording layer formed on said transparent substrate;

a clamp portion at a center portion of said transparent substrate, said clamp portion including a clamp portion surface at a top of said clamp portion and being integrated with said transparent substrate such that said clamp portion and said substrate form a one-piece unitary element; and a hub portion provided on said clamp portion coaxial with said clamp portion, and wherein said hub portion has a through hole into which a spindle shaft of a disc rotation device is inserted and has an outer diameter that is smaller than an outer diameter of said clamp portion;

said clamp portion having a thickness greater than said transparent substrate outside of said center portion, said clamp portion being rotatably supported by a clamper provided in an optical disc recording and/or reproduction apparatus, wherein a distance between a surface of said clamp portion and said recording layer is defined so that a focus point is positioned on said recording layer when said clamp portion is supported by said clamper provided in said optical disc recording and/or reproduction apparatus.

5. An optical disc as claimed in claim 4, said optical disc further comprising a spacer portion having a thickness defined so that said clamp portion has a thickness such that said clamp portion is rotatable supportable by said clamper.

6. An optical disk as claimed in claim 5, wherein said recording layer is at approximately 0.6 mm from the surface of said transparent substrate.

7. A method of farming an improved optical disk having an increased recording density compared with a conventional optical disk, said improved disk for reading and writing data using a laser beam applied via an objective lens provided in an optical disk recording and/or reproduction apparatus, said improved disk including a transparent substrate, a recording layer, a clamp portion at a center portion of said transparent substrate including a clamp portion surface at a top of said clamp portion, and a hub portion provided on said clamp portion coaxial with said clamp portion and said hub portion having a through hole into which a spindle shaft of a disc rotation device is inserted and comprising the steps of:

integrating said transparent substrate and said clamp portion as a one piece unitary element;

reducing the thickness of said transparent substrate outside of said center portion;

correspondingly increasing a difference between the height of said clamp portion and the height of said transparent substrate outside of said center portion so that said recording layer is positioned in the vicinity of a focus position of said objective lens which is at a neutral position; and forming said hub portion to have an outer diameter that is smaller than an outer diameter of said clamp portion.

8. The method of claim 7, further comprising the step of forming said recording layer such that said recording layer is positioned substantially at the focal plane of said objective lens which is at a neutral position.

9. The method of claim 7, further comprising the step of forming said recording layer closer to the surface of said transparent substrate.

10. The method of claim 9, further comprising the step of providing a spacer such that said recording layer is positioned between the spacer and said surface of said transparent substrate.

11. An optical disc for reading and writing data using a laser beam applied via an objective lens provided in an optical disc recording and/or reproduction apparatus, said optical disc comprising:

a transparent substrate;

a recording layer formed on said transparent substrate;

a clamp portion provided at a center portion of said transparent substrate and including a clamp portion surface at a top of said clamp portion;

a hub portion provided on said clamp portion coaxial with said clamp portion, and wherein said hub portion has a through hole into which a spindle shaft of a disc rotation device is inserted and has an outer diameter that is smaller than an outer diameter of said clamp portion;

said clamp portion and said transparent substrate outside of said center portion having surfaces different in height so that said recording layer is positioned in the vicinity of a focus position of said objective lens which is at a neutral position.

12. An optical disc as claimed in claim 11, wherein said disc is a double-sided disc having two of said transparent substrates and two of said recording layers facing to each other and sandwiched by said two transparent substrates.

13. An optical disc as claimed in claim 12, said clamp portion having greater thickness than said substrate outside of said center portion.

14. An optical disc, comprising:

a transparent substrate;

a recording layer formed on said transparent substrate;

a clamp portion at a center portion of said transparent substrate and including a clamp portion surface at a top of said clamp portion; and a hub portion provided on said clamp portion coaxial with said clamp portion, and wherein said hub portion has a through hole into which a spindle shaft of a disc rotation device is inserted and has an outer diameter that is smaller than an outer diameter of said clamp portion;

said clamp portion having a thickness greater than said transparent substrate outside of said center portion, said clamp portion being rotatably supported by a clamper provided in an optical disc recording and/or reproduction apparatus, wherein a distance between a surface of said clamp portion and said recording layer is defined so that a focus point is positioned on said recording layer when said clamp portion is supported by said clamper provided in said optical disc record ing andor reproduction apparatus.

15. An optical disc as claimed in claim 14, said optical disc further comprising a spacer portion having a thickness defined so that said clamp portion has a thickness such that said clamp portion is rotatably supportable by said clamper.

16. An optical disc as claimed in claim 15, wherein said recording layer is formed at approximately 0.6 mm from the surface of said transparent substrate.

17. A method of forming an improved optical disk having an increased recording density compared with a conventional optical disk, said improved disk for reading and writing data using a laser beam applied via an objective lens provided in an optical disk recording and/or reproduction apparatus, said improved disk including a transparent substrate, a recording layer, a clamp portion at a center portion of said transparent substrate including a clamp portion surface at a top of said clamp portion, and a hub portion provided on said clamp portion coaxial with said clamp portion and said hub portion having a through hole into which a spindle shaft of a disc rotation device is inserted and, comprising the steps of:

reducing the thickness of said transparent substrate outside of said center portion;

correspondingly increasing a difference between the height of said clamp portion and the height of said transparent substrate outside of said center portion so that said recording layer is positioned in the vicinity of a focus position of said objective lens which is at a neutral position; and forming said hub portion to have an outer diameter that is smaller than an outer diameter of said clamp portion.

18. The method of claim 17, further comprising the step of forming said recording layer such that said recording layer is positioned substantially at the focal plane of said objective lens which is at a neutral position.

19. The method of claim 17, further comprising the step of forming said recording layer closer to the surface of said transparent substrate.

20. The method of claim 19, further comprising the step of providing a spacer such that said recording layer is positioned between the spacer and said surface of said transparent substrate.

* * * * *